June 9, 1953  D. J. MARIHART  2,641,634
PHASE COMPARISION ELECTRONIC RELAY PROTECTIVE SYSTEM
Filed June 29, 1950
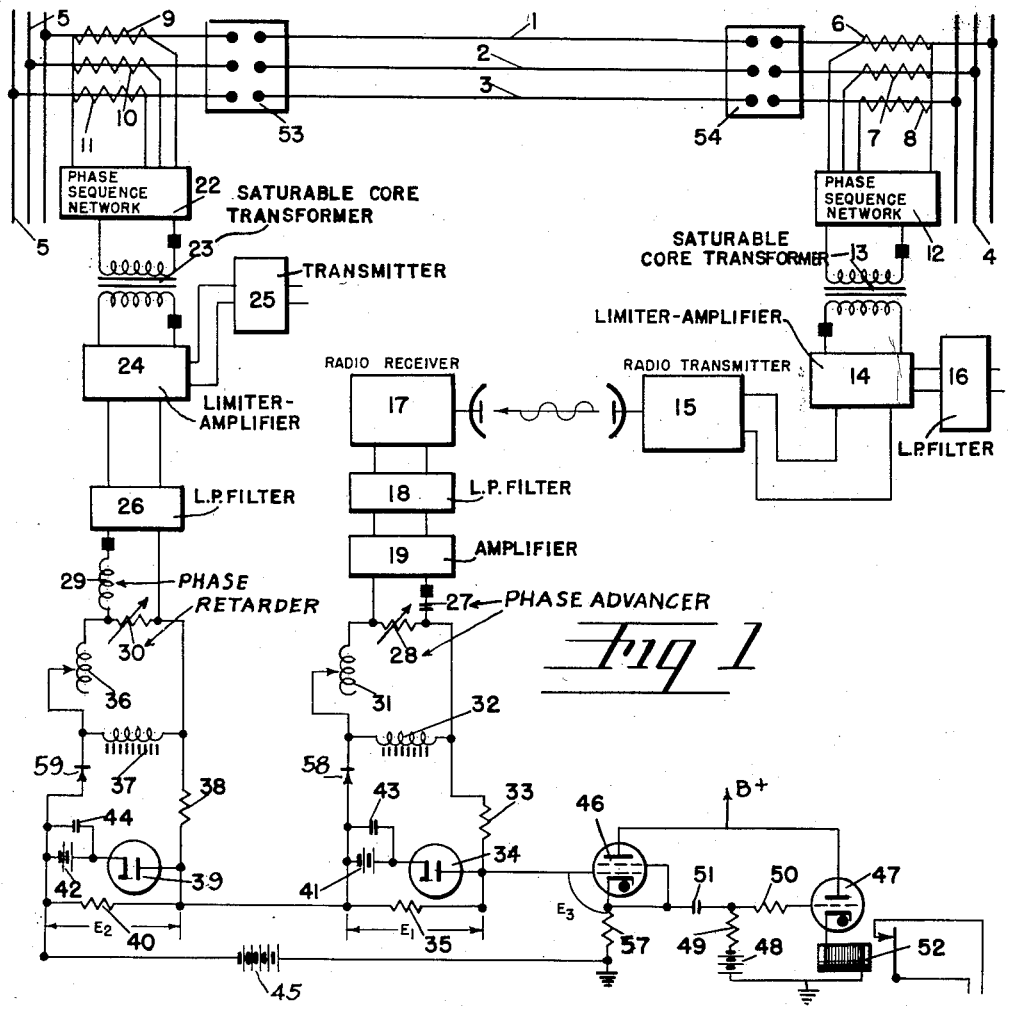
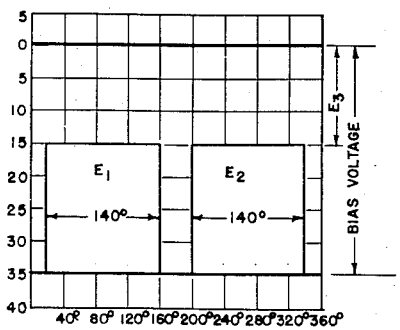
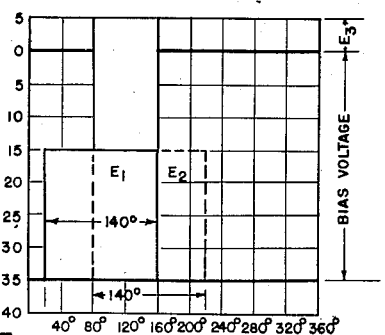
INVENTOR.
DONALD J. MARIHART
BY *Roy C. Hackley Jr.*
ATTORNEY Patented June 9, 1953

2,641,634

UNITED STATES PATENT OFFICE 2,641,634

PHASE COMPARISON ELECTRONIC RELAY PROTECTIVE SYSTEM

Donald J. Marihart, Carnation, Wash.

Application June 29, 1950, Serial No. 171,172

4 Claims. (Cl. 175—294)

(Granted under Title 35, U. S. Code (1952), sec. 266)

The invention described herein may be manufactured and used by or for the Government of the United States for governmental purposes without the payment of any royalty thereon in accordance with the provisions of the act of March 3, 1883 (22 Stat. 625), as amended by the act of April 30, 1928 (45 Stat. 467, 35 U. S. C., 1946 Ed. Sec. 45).

This invention is concerned with the protection of polyphase electric power transmission lines. It is a type of relaying system which compares conditions at the two ends of a transmission line using signal communication between the ends, such as a pilot wire, radio communication, transmission line carrier current or other signalling system. This system is further characterized by the use of conventional phase sequence networks which produce single-phase output voltages for all line conditions: normal load, "through" fault, internal ground fault, internal phase-to-phase fault or internal three-phase fault. The voltage outputs of corresponding networks of this kind at the two ends of the line are in phase with respect to each other for normal loads or through faults, but they will be approximately 180 electrical degrees out of phase for internal fault conditions.

It is desired in the operation of systems of this kind that there be no interruption to service for normal, or even overload conditions or for through faults, which are faults on lines connected to the line under consideration beyond the line circuit breakers. It is desired that circuit breakers at one or both ends of the line be opened when a fault on the line itself, between the circuit breakers occurs.

The detection of an internal fault on the line is best accomplished by the comparsion of line conditions as indicated by phase sequence networks at the two ends of the line. This comparison is accomplished in my invention by transmitting a signal from each end of the line to the other end so that at each end there will be a voltage representing line conditions at both ends of the line. The system which I will describe for one end of the line is identical for both ends.

The transmission of the signal from one end of the line to the other is accomplished in my invention by means already known in the related art and described in another application for patent Serial Number 164,122 filed jointly with Donald L. Wylie on May 24, 1950, and which is now abandoned. Systems such as these require that the communicating signal system between the ends of the line deliver a voltage of the same phase at the receiving end of the line as the voltage at the sending end, and of a magnitude proportional thereto.

This invention is intended to work with conventional circuit breaker tripping circuits including ordinary relays and trip coils.

A principal object of my present invention is to provide a relay system which compares conditions at the two ends of a line within one-cycle time in a 60-cycle system. Another object is to accomplish this result with low volt ampere burden on the line current transformers. Still another object is to provide a system in which differences in turn ratios of current transformers at the two ends of the line will not be an objection. Other objects include the compensation of phase error due to time required for signal transmission, the control of configuration of signal components within the relay system, and the provision of means for preventing faulty relay operation due to loss of system power.

What constitutes my present invention is described in the specification following in reference to the accompanying drawing and succinctly defined in the appended claims.

In the drawing,

Figure 1 is a diagrammatic representation of the invention in one preferred form of embodiment.

Figure 2 is a graphical diagram showing the relationship of certain operating voltages in the system under normal or "through-fault" conditions.

Figure 3 is a diagram corresponding to Figure 2 for internal fault conditions.

Referring to Figure 1, an electric power transmission line comprising conductors 1, 2, and 3 running between two typical substation busses 4 and 5 is provided with conventional current transformers 6, 7, and 8 at bus 4 and 9, 10, and 11 at bus 5. The current transformers at bus 4 are connected to a sequence network 12 of conventional form which produces from the three-phase currents of the line a single-phase current which bears a definite relationship to the positive, negative, and zero-phase sequence currents in the line. This single-phase current is applied to a transformer 13 which delivers a voltage to a limiter-amplifier 14.

Transformer 13, referred to as an input transformer for amplifier 14 limits the voltage input to amplifier 14 by core saturation when the current output of network 12 increases to very large values.

The limiter-amplifier 14 provides a limited, flat-topped wave, output to a radio transmitter 15. The limiting characteristic of the amplifier prevents overdriving the modulator of the transmitter 15. Limiter-amplifier 14 also delivers an output to a low-pass filter 16 for use in associated apparatus apart from the radio transmitter 15.

The radio transmitter 15 sends out a wave which is proportional to the output of amplifier 14. This wave is received by a receiver 17 which delivers a demodulated signal to a low-pass filter 18. This filter provides a sine wave of the fundamental line frequency and also helps to stabilize operation by providing a small amount of electrical inertia. The line frequency sine wave delivered by filter 18 is of comparatively low intensity and is therefore delivered to an amplifier 19 to increase the signal strength sufficiently to operate satisfactorily with the circuits it is intended to control.

At the same end of the line with receiver 17, filter 18 and amplifier 19, current transformers 9, 10, and 11 deliver three-phase currents to a phase sequence network 22 identical with network 12 at the other end of the line. A transformer 23 and a limiter amplifier 24, like transformer 13 and amplifier 14, are provided for corresponding functions. Amplifier 24 delivers outputs to a transmitter 25 and a low-pass filter 26. Transmitter 25 sends signals to a receiver, not shown in the drawing, at the other end of the line.

Amplifier 19 and filter 26 provide voltage outputs which under normal conditions are in opposite phase and of approximately equal magnitude. The time of signal transmission, which delays the arrival of the signals from bus 4 relative to the signals from bus 5, has the same effect as lagging phase shift. This is compensated by a circuit following amplifier 19 capable of advancing the phase of the signals to as much as 20 electrical degrees. This circuit comprises a condenser 27 and a variable resistor 28. Additional phase compensation is provided by a circuit for retarding the phase following filter 26. This circuit comprises an inductance 29 and a variable resistor 30. Resistors 28 and 30 are adjusted so that the voltages across the two resistors are normally in opposite phase.

The voltage across resistor 28 is impressed through a variable reactance 31 on a saturable inductor 32. The saturable inductor 32 and the reactance 31 act to distort the sine wave delivered by amplifier 19 into a flat-topped or "square" wave. This square wave is impressed through a resistor 33 and a half-wave rectifier 58 on a diode 34 which offers a low impedance to voltages in one direction and a high impedance in the other. Rectifier 58 suppresses alternate half-cycles of the square wave and impresses square-shaped pulses of single polarity on a loading resistor 35 and diode 34 producing therein a voltage $E_1$ of fixed magnitude.

The voltage across resistor 30 is treated in the same way as that of resistor 28. An adjustable inductance 36, a saturable reactor 37, a resistor 38, a half-wave rectifier 59 and a diode 39 produce square-shaped pulses of voltage $E_2$ across a resistor 40.

Bias batteries 41 and 42 with by-pass condensers 43 and 44 are provided for diodes 34 and 39, respectively, to control, by rectifier clipping, the magnitudes of the voltage produced across resistors 35 and 40. Rectifiers 58 and 59 in their respective circuits suppress alternate halves of the square waves impressed thereon, passing the halves of the wave which are positive with respect to the ground. The potential differences of the half-waves transmitted by rectifiers 58 and 59 are opposed by the voltages of batteries 41 and 42, respectively, in providing potential differences across resistors 35 and 40 and across diodes 34 and 39. When the rectified square wave potential difference on resistor 35 for example exceeds that of battery 41, the corresponding diode 34 conducts sufficient current so that the voltage drop across resistor 33 together with the other differences of potential in the circuit provides a constant voltage across resistor 35. Thus resistors 35 and 40 are subjected to positive polarized half-cycles of square waves of transmission line frequency.

Resistors 35 and 40 are connected in series as shown with polarities in the same direction, and in series with a bias battery 45 to provide a resultant voltage on the grid of a grid-controlled tube 46, referred to for convenience as a gas tetrode. A load resistor 57, shown connected between the cathode of tube 46 and the ground return circuit, is provided for current limitation when firing and for producing an output voltage for controlling thyratron 47 or any other convenient relay circuit.

Thyratron 47, in a conventional way, is biased by a battery 48, a resistor 49 and a second resistor 50. Voltage impulses for firing tube 47 are impressed by tube 46 through a condenser 51. Thyratron 47 operates a relay 52 or any other convenient arrangement for tripping a circuit breaker 53 at bus 5.

An identical arrangement of devices and circuits is provided at the bus 4 end of the line for controlling a circuit breaker 54 at that end.

Under normal conditions of operating which include any condition except a fault on the line between circuit breakers 53 and 54, half-cycle square waves are produced by diodes 34 and 39 as illustrated in Fig. 2. These half waves are adjusted by reactances 31 and 36 and inductors 32 and 37 to a pulse width of 90 to 180 electrical degrees. Fig. 2 is drawn for a pulse width of 140 degrees with a 40-degree space between pulses. The voltage magnitudes of the pulses $E_1$ and $E_2$ are limited in respect to the bias voltage of battery 45 so that the resultant voltage $E_3$ is always negative under conditions except an internal line fault. Even a fault outside the line, such as a fault on bus 4 or bus 5, will not produce an $E_1$ or $E_2$ sufficiently large to approach the normal bias voltage.

Under fault conditions, that is a fault on the line between circuit breakers 53 and 54, the outputs of sequence networks 12 and 22 shift in phase to as much as 180 electrical degrees. Fig. 3 shows the phase displacement of $E_2$ with respect to $E_1$ which produces during part of the cycle a periodic voltage $E_1$ plus $E_2$. This total voltage is sufficient to overcome the negative bias voltage so $E_3$, the resultant voltage, becomes positive. This causes tube 46 to fire and to open circuit breaker 53.

In both Figs. 2 and 3 the region of negative 2 to 5 volts indicates the voltage which needs to be attained by $E_1$ plus $E_2$ in order to fire tube 46. Actually $E_1$ plus $E_2$ will, under ordinary conditions of adjustment, exceed the negative bias voltage so that $E_3$ becomes positive assuring an ample margin of operating voltage. The pulse width of 140 electrical degrees provides a 40-degree spacing between successive pulses which prevents small changes in phase angle from operating the system under normal conditions. A pulse width of 180 degrees would provide no safety margin and with that pulse width any small transient displacement of $E_1$ or $E_2$ with respect to the other would cause an operation. A pulse width of 90 degrees would prevent operation except under conditions of maximum phase displacement. A pulse width of 140 degrees is illustrative of a good working adjustment.

I claim:

1. In a protective relay system for an electric power transmission line, the combination of means for deriving, at one end of a line, two single-phase voltages, respectively indicative of the phase of the phase-sequence currents at the two ends of the line, means for deriving from each of said two voltages a sequence of flat-topped electrical pulses of like polarity and each of approximately 140° electrical length, which, under normal line conditions, are non-concurrent, but which under fault conditions in said line become concurrent and productive of a voltage which is the sum of the voltages of the two pulses, a grid-controlled gaseous discharge tube and means for supplying to the grid thereof a negative bias voltage, and means for opposing said bias voltage with the voltage of said pulses, said tube firing when said pulses become concurrent.

2. In a protective relay system for an electric power transmission line, the combination of a grid-controlled gaseous discharge tube controlling a circuit breaker, two circuits producing flat-topped electrical voltage pulses of like polarity and each of approximately 140° electrical length and related, respectively, to the phase sequences of currents at the two ends of said line, means for applying said pulses to the control grid of said tube together with a bias voltage, means for timing said pulses relatively to prevent their voltages being concurrently additive when the sequence currents at the two ends of said line are in phase and to make the pulse voltages additive when the sequence currents at the ends of said line contain out-of-phase components, and means for actuating said tube when the combined voltage of said pulses attains a predetermined value.

3. In a protective relay system for an electric power transmission line, the combination of a phase sequence network supplying input to a limiter-amplifier at each end of the line, and a communication channel from one of said amplifiers to the other end of said line, two low-pass filters at one end of said line, one filter receiving a signal from the amplifier at that end of the line, the other filter receiving a signal from said communication channel, two circuits individually responsive to said filters, each circuit comprising a generator of spaced electrical voltage pulses whose phase spacing is determined by the phase of currents received by said filters, means for superimposing said pulses on a relay control circuit together with a fixed reference voltage, and means for activating said relay circuit when the instantaneous voltages of said pulses combine to exceed said reference voltage.

4. In a protective relay system for an electric power transmission line, the combination of a phase sequence network supplying input to a limiter-amplifier at each end of the line, and a communication channel from one of said amplifiers to the other end of said line, two low-pass filters at one end of said line, one filter receiving a signal from the amplifier at that end of the line, the other filter receiving a signal from said communication channel, two circuits individually responsive to said filters, each circuit comprising a wave shaper deriving a square wave from the output of the associated filter and a rectifier deriving spaced electrical voltage pulses from the square wave output of the associated shaper, means phasing the pulses in at least one of the circuits relative to those in the other, means for superimposing said pulses on a relay control circuit together with a fixed reference voltage, and means for activating said relay circuit when the instantaneous voltages of said pulses combine to exceed said reference voltage.

DONALD J. MARIHART.

References Cited in the file of this patent

UNITED STATES PATENTS

| Number | Name | Date |
|---|---|---|
| 2,213,294 | Ward | Sept. 3, 1940 |
| 2,287,926 | Zepler | June 30, 1942 |
| 2,406,616 | Lensner | Aug. 27, 1946 |
| 2,406,617 | Lensner | Aug. 27, 1946 |
| 2,408,868 | Mehring et al. | Oct. 8, 1946 |
| 2,487,603 | Scales | Nov. 8, 1949 |
| 2,529,723 | Chevallier | Nov. 14, 1950 |
| 2,558,085 | Harder | June 26, 1951 |
| 2,594,371 | Ward | Apr. 29, 1952 |